No. 700,876. Patented May 27, 1902.
W. J. WISWALL.
CULTIVATOR.
(Application filed Jan. 27, 1902.)
(No Model.) 2 Sheets—Sheet 1.

Witnesses:
Arthur McArthur
George McDougall

Inventor:
Wm. J. Wiswall.
By Fischer & Thorpe
Attys.

No. 700,876. Patented May 27, 1902.
W. J. WISWALL.
CULTIVATOR.
(Application filed Jan. 27, 1902.)
(No Model.) 2 Sheets—Sheet 2.

Witnesses:
Arthur McArthur
George McDougall

Inventor:
Wm. J. Wiswall
By Fischer & Thorpe
Attys.

UNITED STATES PATENT OFFICE.

WILLIAM J. WISWALL, OF KANSAS CITY, MISSOURI, ASSIGNOR OF ONE-HALF TO G. A. PLANK, OF KANSAS CITY, MISSOURI.

CULTIVATOR.

SPECIFICATION forming part of Letters Patent No. 700,876, dated May 27, 1902.

Application filed January 27, 1902. Serial No. 91,483. (No model.)

*To all whom it may concern:*

Be it known that I, WILLIAM J. WISWALL, a citizen of the United States, residing at Kansas City, in the county of Jackson and State of Missouri, have invented certain new and useful Improvements in Cultivators, of which the following is a specification.

My invention relates to a cultivator of that type which when used for cultivating two rows simultaneously is automatically adjustable to accommodate varying distances between the rows; and my object is to produce a machine of this character embodying the usual seat-plank adapted to be automatically disposed at various angles to the line of draft during the progress of the machine, and a pair of sliding frames pivoted to said plank and arranged to reciprocate at right angles to the line of draft without regard to the angle of said plank, so as to eliminate friction and relieve the machine-frames of considerable of the twisting strain to which they are exposed in operation.

A further object is to provide means to maintain the machine upright when used as a single-row cultivator and traveling to or from the field or turning at the end of the row.

Other objects relating chiefly to the structural features will hereinafter appear and be pointed out in the appended claims, and in order that the invention may be fully understood reference is to be had to the accompanying drawings, in which—

Figure 1:
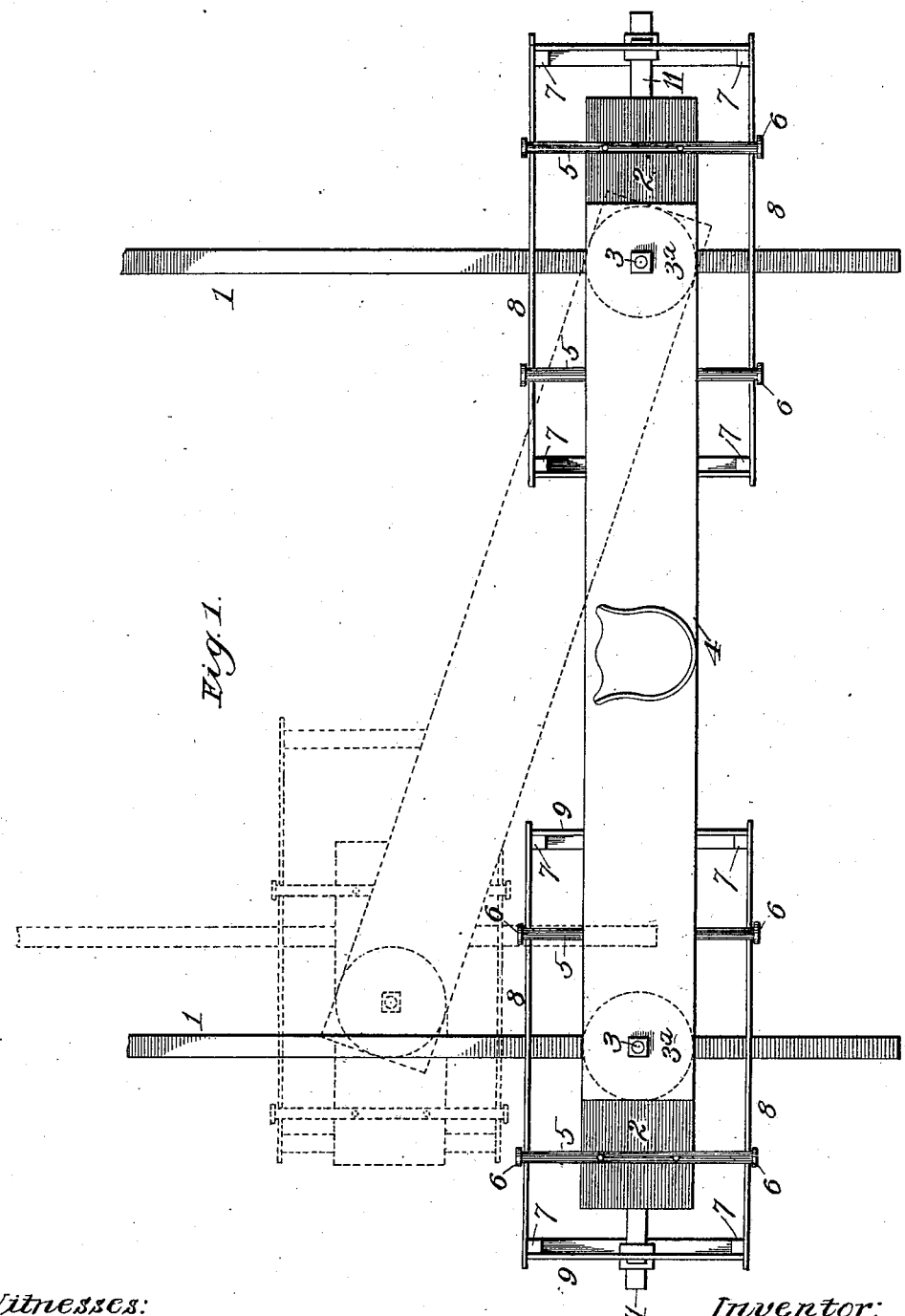
Figure 2:
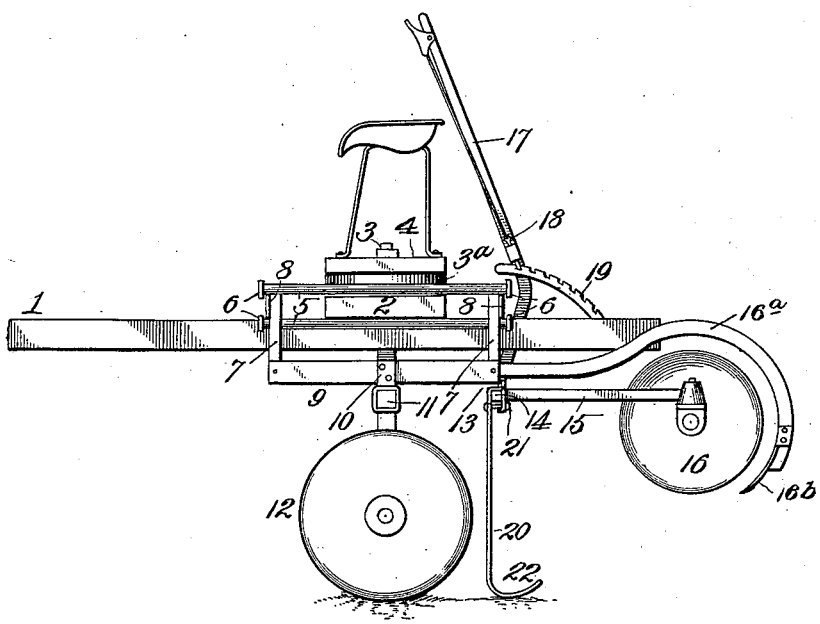
Figure 3:
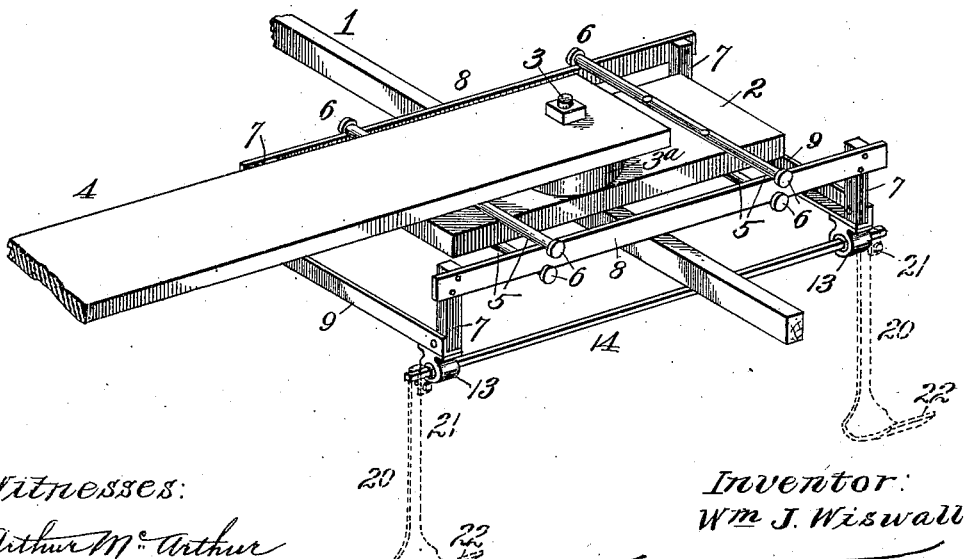

Figure 1 represents a top plan view of a two-row cultivator embodying my invention with the cultivating appliances and other controlling mechanism omitted. Fig. 2 is a side view of the machine as used as a single-row cultivator and when traveling to or from the field. Fig. 3 is a perspective view of a portion of the seat-plank, one of the reciprocatory frames pivoted thereto, and of the corresponding sliding frame for carrying the cultivating appliances.

In the said drawings, 1 designates the tongues of the frames, and 2 designates short planks above the tongues and connected by vertical pivots 3 to the opposite ends of the seat-plank 4, connecting the machines, the seat-plank being above and spaced from the planks 2 by means of the interposed washers 3ª in order to provide a space between planks 2 and plank 4 for the upper cross-bars 5, secured to the former and projecting beyond their front and rear edges and terminating in enlargements or heads 6.

The frames which carry the cultivating appliances, as hereinafter explained, consist of four short standards 7, disposed rectangularly with regard to each other, the standards at their upper ends being connected in pairs by transverse bars 8, and at their lower ends in pairs by longitudinal bars 9, so as to constitute a rigid rectangular frame which is supported by and adapted to reciprocate on the bars 5 of the reciprocatory planks, said bars engaging the upper and lower edges of cross-bars 8. The rectangular frames are prevented from moving longitudinally by the heads or enlargements 6 of bars 5, but may move laterally until arrested by the contact of the lower bars 5 with standards 7.

Secured to and rigidly depending from each bar 9 is a sleeve-hanger 10, wherein are secured the shafts 11, from each of which depends the arms on which the carrying-wheels 12 are journaled in the usual or any preferred manner, only one sleeve-hanger, arm, and wheel of each frame being shown in the drawings.

13 designates bearing-sleeves depending from the rear corners of the rectangular frames and forming journals for the transverse shafts 14, which shafts are each equipped with a pair of arms 15, carrying cultivating-disks 16 in the usual manner, each shaft also carrying a pair of the depending arms 16ª, equipped with shovels 16ᵇ at their lower ends and adapted to perform their usual function, only one arm 15, disk 16, arm 16ª, and shovel 16ᵇ appearing in the drawings, as these in number and arrangement are the same as those generally found in this class of machines.

17 designates the usual lever for each frame, the same being mounted on shaft 14 and provided with the usual dog 18 for engagement with sector 19, secured to the tongue, so that the operation of the lever backward or forward lowers the cultivating appliances to operative or raises them to inoperative position.

When one member of this machine is to be employed as a single-row cultivator, the seat-plank is of course removed and hanger-guards 20 are secured to the ends of shaft 14 of the proper member, said hangers having their upper ends hooked over the shaft, which is preferably rectangular and clamped thereto, as shown at 21, and having their lower ends bent to approximately semicircular form in side view, so as to readily glide, like a sled, over small obstructions in their paths. These hanger-guards, as will be readily understood by reference to Figs. 2 and 3, will prevent the machine toppling over sidewise when traveling to or from the field or in turning at the end of a row, as wheels 12, being close together, could not be relied upon to maintain the equilibrium of the machine, especially when turning. The hanger-guards are disposed at such an angle to arms 15 that when the latter occupy their inoperative position the former occupy their operative position and obviously swing forwardly and upward to their inoperative position as the cultivating appliances are lowered for operation. When used as a double-row cultivator, it will be apparent, by reference to Fig. 1 in particular, that the relative position of the cultivating members does not affect the relation between the reciprocatory planks and said members—that is to say, the relative movement of said planks and members is always at right angles to the line of draft. It is also apparent that the pivotal connections between the sliding planks and the seat-plank enables the latter to vary its angle to the line of draft accordingly as the members move nearer to or farther from each other without imparting other movement to said planks than a movement at right angles to the line of draft. It will be apparent, therefore, that these sliding planks largely eliminate friction which would necessarily exist without their interposition between the seat-plank and the cultivating-frames and that for the same reason the twisting strain which generally affects the rigidity and stability of this class of machines is largely done away with. It will be understood, of course, that friction may be further reduced by the use of the common and well-known antifriction-rollers and that other changes in the machine as regards its form, detailed construction, and organization may be made without departing from the spirit and scope or sacrificing any of the advantages of the invention.

Having thus described the invention, what I claim as new, and desire to secure by Letters Patent, is—

1. In a cultivator, a suitable frame, wheels supporting the same, a transverse shaft supported by said frame rearward of said wheels, beams and hanger-guards supported at their upper ends from said shaft and movable with the latter, said beams and hanger-guards extending at an angle to each other, cultivating appliances supported from said beams, a lever for operating said shaft and thereby synchronously raising said cultivating appliances and lowering said hanger-guards or lowering said cultivating appliances and raising said hanger-guards, and means for securing said lever in the desired adjustment.

2. In a cultivator, a pair of wheel-supported frames equipped with cultivating appliances and means for operating the latter, planks mounted to slide transversely of the machine in said frames, and a seat-plank pivotally connecting said sliding planks.

3. In a cultivator, a pair of wheel-supported frames equipped with cultivating appliances and means for operating the latter, planks mounted in said frames and free to move laterally but not forwardly or rearwardly thereof, parallel bars secured to said planks and engaging said wheel-supported frames, and a seat-plank pivotally connecting said sliding planks.

4. In a cultivator, a pair of wheel-supported frames, equipped with cultivating appliances and means for operating the latter, planks within said frames and adapted to slide laterally thereof, parallel bars secured to said planks and engaging the wheel-supported frames and provided with enlargements or heads for preventing the planks sliding forwardly or rearwardly in said wheel-supported frames, and a seat-plank pivotally connecting said sliding planks.

5. In a cultivator, a pair of wheel-supported frames equipped with cultivating appliances and means for operating the latter, said frames embodying front and rear transverse bars, planks adapted to slide laterally of said frames and provided with sets of parallel bars at opposite sides of their centers, said bars engaging the upper and lower edges of the transverse bars of the wheel-supported frames, and a seat-plank pivotally connecting said sliding planks.

6. In a cultivator, the combination of wheel-supported frames equipped with cultivating appliances and means for operating the latter, planks arranged to slide laterally of and supported by said frames, tongues bolted to the under side of said planks and projecting forwardly therefrom, and a seat-plank pivoted at its opposite ends upon said bolts above said sliding planks.

In testimony whereof I affix my signature in the presence of two witnesses.

WILLIAM J. WISWALL.

Witnesses:
H. C. RODGERS,
G. Y. THORPE.